US011036393B2

United States Patent
Miller et al.

(10) Patent No.: US 11,036,393 B2
(45) Date of Patent: *Jun. 15, 2021

(54) MIGRATING DATA BETWEEN VOLUMES USING VIRTUAL COPY OPERATION

(71) Applicant: Pure Storage, Inc., Mountain View, CA (US)

(72) Inventors: Ethan Miller, Santa Cruz, CA (US); Lydia Do, Raleigh, NC (US); John Colgrove, Los Altos, CA (US)

(73) Assignee: PURE STORAGE, INC., Mountain View, CA (US)

( * ) Notice: Subject to any disclaimer, the term of this patent is extended or adjusted under 35 U.S.C. 154(b) by 151 days.

This patent is subject to a terminal disclaimer.

(21) Appl. No.: 16/195,403

(22) Filed: Nov. 19, 2018

(65) Prior Publication Data

US 2019/0087094 A1    Mar. 21, 2019

Related U.S. Application Data

(63) Continuation of application No. 15/284,777, filed on Oct. 4, 2016, now Pat. No. 10,162,523.

(51) Int. Cl.
*G06F 3/06* (2006.01)
*G06F 16/182* (2019.01)

(52) U.S. Cl.
CPC .......... *G06F 3/0604* (2013.01); *G06F 3/061* (2013.01); *G06F 3/064* (2013.01); *G06F 3/067* (2013.01);

(Continued)

(58) Field of Classification Search
CPC .... G06F 3/0608; G06F 3/0647; G06F 3/0643; G06F 3/067; G06F 16/1825;
(Continued)

(56) References Cited

U.S. PATENT DOCUMENTS

| 5,208,813 A | 5/1993 | Stallmo |
| 5,403,639 A | 4/1995 | Belsan |

(Continued)

FOREIGN PATENT DOCUMENTS

| CN | 103370685 A | 10/2013 |
| CN | 103370686 A | 10/2013 |

(Continued)

OTHER PUBLICATIONS

Microsoft Corporation, "GCSettings.IsServerGC Property", Retrieved Oct. 27, 2013 via the WayBack Machine, 3 pages.

(Continued)

*Primary Examiner* — Reginald G Bragdon
*Assistant Examiner* — Curtis James Kortman
(74) *Attorney, Agent, or Firm* — Womble Bond Dickinson (US) LLP

(57) ABSTRACT

A storage controller coupled to a storage array comprising one or more storage devices initiates a transformation of data from a block-based storage system resident on the storage array to a file-based storage system resident on a storage array. The storage controller identifies a plurality of data blocks to be transformed from the block-based storage system and generates metadata for a file in the file-based storage system, the metadata to associate the plurality of data blocks with the file.

20 Claims, 7 Drawing Sheets

(52) U.S. Cl.
CPC .......... *G06F 3/0631* (2013.01); *G06F 3/0638* (2013.01); *G06F 3/0643* (2013.01); *G06F 3/0647* (2013.01); *G06F 3/0689* (2013.01); *G06F 16/1827* (2019.01)

(58) Field of Classification Search
CPC .... G06F 16/1827; G06F 3/0604; G06F 3/061; G06F 3/0631; G06F 3/0638; G06F 3/064; G06F 3/0689
See application file for complete search history.

(56) References Cited

U.S. PATENT DOCUMENTS

| | | | |
|---|---|---|---|
| 5,940,838 | A | 8/1999 | Schmuck et al. |
| 6,263,350 | B1 | 7/2001 | Wollrath et al. |
| 6,412,045 | B1 | 6/2002 | DeKoning et al. |
| 6,718,448 | B1 | 4/2004 | Ofer |
| 6,757,769 | B1 | 6/2004 | Ofer |
| 6,799,283 | B1 | 9/2004 | Tamai et al. |
| 6,834,298 | B1 | 12/2004 | Singer et al. |
| 6,850,938 | B1 | 2/2005 | Sadjadi |
| 6,915,434 | B1 | 7/2005 | Kuroda |
| 6,973,549 | B1 | 12/2005 | Testardi |
| 7,028,216 | B2 | 4/2006 | Aizawa et al. |
| 7,028,218 | B2 | 4/2006 | Schwarm et al. |
| 7,039,827 | B2 | 5/2006 | Meyer et al. |
| 7,216,164 | B1 | 5/2007 | Whitmore et al. |
| 7,783,682 | B1 | 8/2010 | Patterson |
| 7,873,619 | B1 | 1/2011 | Faibish et al. |
| 7,913,300 | B1 | 3/2011 | Flank et al. |
| 7,933,936 | B2 | 4/2011 | Aggarwal et al. |
| 7,979,613 | B2 | 7/2011 | Zohar et al. |
| 8,086,652 | B1 | 12/2011 | Bisson et al. |
| 8,117,464 | B1 | 2/2012 | Kogelnik |
| 8,200,887 | B2 | 6/2012 | Bennett |
| 8,205,065 | B2 | 6/2012 | Matze |
| 8,290,911 | B1* | 10/2012 | Janakiraman ....... G06F 16/1752 707/640 |
| 8,352,540 | B2 | 1/2013 | Anglin et al. |
| 8,527,544 | B1 | 9/2013 | Colgrove et al. |
| 8,560,747 | B1 | 10/2013 | Tan et al. |
| 8,621,241 | B1 | 12/2013 | Stephenson |
| 8,700,875 | B1 | 4/2014 | Barron et al. |
| 8,751,463 | B1 | 6/2014 | Chamness |
| 8,806,160 | B2 | 8/2014 | Colgrove et al. |
| 8,874,850 | B1 | 10/2014 | Goodson et al. |
| 8,959,305 | B1 | 2/2015 | Lecrone et al. |
| 9,081,713 | B1 | 7/2015 | Bennett |
| 9,189,334 | B2 | 11/2015 | Bennett |
| 9,311,182 | B2 | 4/2016 | Bennett |
| 9,423,967 | B2 | 8/2016 | Colgrove et al. |
| 9,436,396 | B2 | 9/2016 | Colgrove et al. |
| 9,436,720 | B2 | 9/2016 | Colgrove et al. |
| 9,454,476 | B2 | 9/2016 | Colgrove et al. |
| 9,454,477 | B2 | 9/2016 | Colgrove et al. |
| 9,513,820 | B1 | 12/2016 | Shalev |
| 9,516,016 | B2 | 12/2016 | Colgrove et al. |
| 9,552,248 | B2 | 1/2017 | Miller et al. |
| 9,632,870 | B2 | 4/2017 | Bennett |
| 10,162,523 | B2* | 12/2018 | Miller ................... G06F 3/0604 |
| 2002/0038436 | A1 | 3/2002 | Suzuki |
| 2002/0087544 | A1 | 7/2002 | Selkirk et al. |
| 2002/0178335 | A1 | 11/2002 | Selkirk et al. |
| 2003/0140209 | A1 | 7/2003 | Testardi |
| 2004/0049572 | A1 | 3/2004 | Yamamoto et al. |
| 2005/0015415 | A1* | 1/2005 | Garimella ............ G06F 3/0623 |
| 2005/0066095 | A1 | 3/2005 | Mullick et al. |
| 2005/0216535 | A1 | 9/2005 | Saika et al. |
| 2005/0223154 | A1 | 10/2005 | Uemura |
| 2006/0074940 | A1 | 4/2006 | Craft et al. |
| 2006/0090049 | A1 | 4/2006 | Saika |
| 2006/0136365 | A1 | 6/2006 | Kedem et al. |
| 2006/0155946 | A1 | 7/2006 | Ji |
| 2006/0218207 | A1* | 9/2006 | Nonaka ............... G06F 16/1794 |
| 2007/0067585 | A1 | 3/2007 | Ueda et al. |
| 2007/0109856 | A1 | 5/2007 | Pellicone et al. |
| 2007/0162954 | A1 | 7/2007 | Pela |
| 2007/0171562 | A1 | 7/2007 | Maejima et al. |
| 2007/0174673 | A1 | 7/2007 | Kawaguchi et al. |
| 2007/0220313 | A1 | 9/2007 | Katsuragi et al. |
| 2007/0245090 | A1 | 10/2007 | King et al. |
| 2007/0266179 | A1 | 11/2007 | Chavan et al. |
| 2008/0059699 | A1 | 3/2008 | Kubo et al. |
| 2008/0065852 | A1 | 3/2008 | Moore et al. |
| 2008/0134174 | A1 | 6/2008 | Sheu et al. |
| 2008/0155191 | A1 | 6/2008 | Anderson et al. |
| 2008/0178040 | A1 | 7/2008 | Kobayashi |
| 2008/0209096 | A1 | 8/2008 | Lin et al. |
| 2008/0244205 | A1 | 10/2008 | Amano et al. |
| 2008/0275928 | A1 | 11/2008 | Shuster |
| 2008/0282045 | A1 | 11/2008 | Biswas et al. |
| 2008/0285083 | A1 | 11/2008 | Aonuma |
| 2008/0307270 | A1 | 12/2008 | Li |
| 2009/0006587 | A1 | 1/2009 | Richter |
| 2009/0037662 | A1 | 2/2009 | La Frese et al. |
| 2009/0144347 | A1* | 6/2009 | Boyd ................... G06F 16/122 |
| 2009/0204858 | A1 | 8/2009 | Kawaba |
| 2009/0228648 | A1 | 9/2009 | Wack |
| 2009/0300084 | A1 | 12/2009 | Whitehouse |
| 2010/0057673 | A1 | 3/2010 | Savov |
| 2010/0058026 | A1 | 3/2010 | Heil et al. |
| 2010/0067706 | A1 | 3/2010 | Anan et al. |
| 2010/0077205 | A1 | 3/2010 | Ekstrom et al. |
| 2010/0082879 | A1 | 4/2010 | McKean et al. |
| 2010/0106905 | A1 | 4/2010 | Kurashige et al. |
| 2010/0153620 | A1 | 6/2010 | McKean et al. |
| 2010/0153641 | A1 | 6/2010 | Jagadish et al. |
| 2010/0191897 | A1 | 7/2010 | Zhang et al. |
| 2010/0250802 | A1 | 9/2010 | Waugh et al. |
| 2010/0250882 | A1 | 9/2010 | Hutchison et al. |
| 2010/0281225 | A1 | 11/2010 | Chen et al. |
| 2010/0287327 | A1 | 11/2010 | Li et al. |
| 2011/0072300 | A1 | 3/2011 | Rousseau |
| 2011/0121231 | A1 | 6/2011 | Haas et al. |
| 2011/0145598 | A1 | 6/2011 | Smith et al. |
| 2011/0161559 | A1 | 6/2011 | Yurzola et al. |
| 2011/0167221 | A1 | 7/2011 | Pangal et al. |
| 2011/0238634 | A1 | 9/2011 | Kobara |
| 2012/0023375 | A1 | 1/2012 | Dutta et al. |
| 2012/0036309 | A1 | 2/2012 | Dillow et al. |
| 2012/0117029 | A1 | 5/2012 | Gold |
| 2012/0198175 | A1 | 8/2012 | Atkisson |
| 2012/0330954 | A1 | 12/2012 | Sivasubramanian et al. |
| 2013/0042052 | A1 | 2/2013 | Colgrove et al. |
| 2013/0046995 | A1 | 2/2013 | Movshovitz |
| 2013/0047029 | A1 | 2/2013 | Ikeuchi et al. |
| 2013/0091102 | A1 | 4/2013 | Nayak |
| 2013/0205110 | A1 | 8/2013 | Kettner |
| 2013/0227236 | A1 | 8/2013 | Flynn et al. |
| 2013/0262800 | A1* | 10/2013 | Goodman ............. G06F 16/128 711/162 |
| 2013/0275391 | A1 | 10/2013 | Batwara et al. |
| 2013/0275656 | A1 | 10/2013 | Talagala et al. |
| 2013/0283058 | A1 | 10/2013 | Fiske et al. |
| 2013/0290648 | A1 | 10/2013 | Shao et al. |
| 2013/0318314 | A1 | 11/2013 | Markus et al. |
| 2013/0339303 | A1 | 12/2013 | Potter et al. |
| 2014/0052946 | A1 | 2/2014 | Kimmel |
| 2014/0068791 | A1 | 3/2014 | Resch |
| 2014/0089730 | A1 | 3/2014 | Watanabe et al. |
| 2014/0101361 | A1 | 4/2014 | Gschwind |
| 2014/0143517 | A1 | 5/2014 | Jin et al. |
| 2014/0172929 | A1 | 6/2014 | Sedayao et al. |
| 2014/0201150 | A1 | 7/2014 | Kumarasamy et al. |
| 2014/0215125 | A1* | 7/2014 | Sela ..................... G06F 3/0652 711/103 |
| 2014/0215129 | A1 | 7/2014 | Kuzmin et al. |
| 2014/0229131 | A1 | 8/2014 | Cohen et al. |
| 2014/0229452 | A1 | 8/2014 | Serita et al. |
| 2014/0281308 | A1 | 9/2014 | Lango et al. |
| 2014/0325115 | A1 | 10/2014 | Ramsundar et al. |
| 2015/0234709 | A1 | 8/2015 | Koarashi |
| 2015/0244775 | A1 | 8/2015 | Vibhor et al. |
| 2015/0278534 | A1 | 10/2015 | Thiyagarajan et al. |

(56) References Cited

U.S. PATENT DOCUMENTS

| | | |
|---|---|---|
| 2016/0019114 A1 | 1/2016 | Han et al. |
| 2016/0098191 A1 | 4/2016 | Golden et al. |
| 2016/0098199 A1 | 4/2016 | Golden et al. |
| 2016/0335009 A1 | 11/2016 | Vijayan et al. |

FOREIGN PATENT DOCUMENTS

| | | |
|---|---|---|
| CN | 104025010 B | 11/2016 |
| EP | 3066610 A1 | 9/2016 |
| EP | 3082047 A1 | 10/2016 |
| EP | 3120235 A | 1/2017 |
| JP | 2007-087036 A | 4/2007 |
| JP | 2007-094472 A | 4/2007 |
| JP | 2008-250667 A | 10/2008 |
| JP | 2010-211681 A | 9/2010 |
| WO | WO-1995/002349 A1 | 1/1995 |
| WO | WO-1999/013403 A1 | 3/1999 |
| WO | WO-2008/102347 A1 | 8/2008 |
| WO | WO-2010/071655 A1 | 6/2010 |

OTHER PUBLICATIONS

Microsoft Corporation, "Fundamentals of Garbage Collection", Retrieved Aug. 30, 2013 via the WayBack Machine, 11 pages.

\* cited by examiner

MIGRATING DATA BETWEEN VOLUMES USING VIRTUAL COPY OPERATION

REFERENCE TO RELATED APPLICATION

This application is a continuation of U.S. application Ser. No. 15/284,777 filed Oct. 4, 2016, the contents of which are hereby incorporated by reference.

BACKGROUND

As computer memory storage and data bandwidth increase, so does the amount and complexity of data that businesses manage daily. Large-scale distributed storage systems, such as data centers, typically run many business operations. A datacenter, which also may be referred to as a server room, is a centralized repository, either physical or virtual, for the storage, management, and dissemination of data pertaining to one or more businesses. A distributed storage system may be coupled to client computers interconnected by one or more networks. If any portion of the distributed storage system has poor performance, company operations may be impaired. A distributed storage system therefore maintains high standards for data availability and high-performance functionality

BRIEF DESCRIPTION OF THE DRAWINGS

The present disclosure is illustrated by way of example, and not by way of limitation, in the figures of the accompanying drawings.

DETAILED DESCRIPTION

Figure 1:
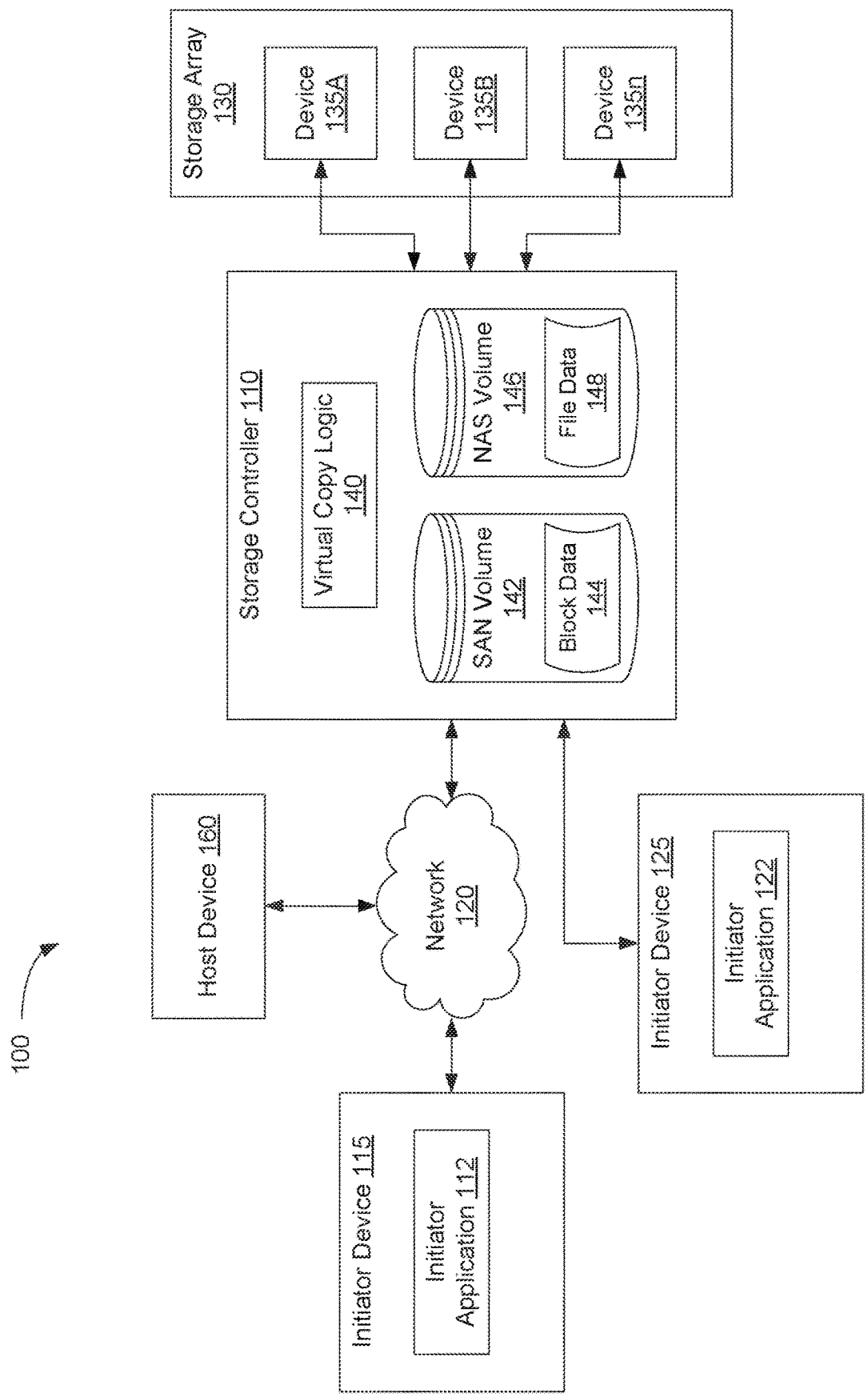
FIG. 1 is a block diagram illustrating a storage system in which embodiments of the present disclosure may be implemented.

Embodiments are described for migrating data between volumes using a virtual copy operation. In one embodiment, a user may wish to migrate data from an existing block-based storage system, in a storage area network (SAN) volume, for example to a file-based storage system, perhaps managed by a network attached storage (NAS) server. Conventional systems performing such a migration generally involve having a client copy data from the SAN volume, which may be fronted by a file system, to a NAS volume. In some cases, though, the SAN volume and destination NAS volume may be located on storage devices in the same storage array. When the migration is being performed within the same storage array, it may not be necessary to actually copy any data, which utilizes processing resources and bandwidth. Instead, in one embodiment, the storage system can use the virtual copy techniques described herein.

In one embodiment, virtual copy logic having knowledge of the file structure on the SAN volume goes through the volume, associating particular blocks with the destination NAS volume. For example, this approach might identify block numbers 5, 100, 72, and 90 from the SAN volume as blocks to migrate and include in the NAS volume. The virtual copy logic may instruct the destination NAS volume to make this association by adding an indication of the identified blocks (i.e., virtual block numbers) to volume metadata corresponding to the NAS volume. In addition, certain blocks included in the SAN volume may include file metadata specifying the structure and contents of a particular file to be included on the NAS volume. The virtual copy logic can add the file metadata to the filesystem of the NAS volume to create the file out of the underlying data blocks. If the logical volumes are on the same storage system, no actual movement of the underlying data is involved. Instead, the virtual copy operation establishes a relationship between the data blocks (or other data elements) from a first logical volume and the file name from the second logical volume. This approach is much faster than a client reading the data from the SAN volume and subsequently writing it to the NAS volume. The virtual copy operation requires no user data transfer and minimal bandwidth to implement. As a result, the virtual copy operation is faster and more efficient than copying the data directly. In addition, the virtual copy operation prevents the unnecessary creation of duplicate copies of the underlying data which saves valuable space on the physical storage medium.

In one embodiment, the destination NAS volume may optionally renumber the data blocks in the file into a more efficient arrangement. In this embodiment, the migration client would still provide the block numbers and the destination file name, but the NAS volume may establish new links with new block numbers to the existing data. For example, using the previous copy example, the NAS server might rename the data blocks to be 8, 9, 10, 11 on the NAS volume, while preserving their physical location on the underlying flash storage devices. In this case, the NAS server can then use more efficient metadata layouts because the block locations have been "normalized." For example, the blocks migrated to the file could be represented by the single extent 8-11. The result is a virtual defragmentation performed by identifying blocks that go together and renumbering them so that they can be described more efficiently. Furthermore, this approach requires very little extra storage space since both the old and new volumes use the same underlying storage devices. The only additional extra space utilized is for metadata storage in the new volume. Since metadata typically represents less than 1% of the total storage space required, this is a highly efficient way to migrate data from block-based storage systems to file or object storage systems.

Whether or not the blocks are renumbered upon migration, there is no requirement that the NAS server use the same file system type as that in use on the SAN volume, assuming that the NAS server supports the naming conventions and other user visible features of the file system. In this embodiment, the NAS volume could simply allocate slightly more space than the SAN volume utilizes and place metadata structures above the SAN volume. When the blocks are renumbered, the destination volume can be the same size as the source volume, or would allow alternate volume layouts. This approach can be very useful in migrating SAN volumes under regular file system management to NAS file systems.

In another embodiment, the virtual copy techniques described herein can be used to migrate data between two file-based storage systems as well. As with the migrations from block-based storage systems to file-based storage systems, this type of migration need not include physical copying if the two file system volumes are on the same server. Instead, the destination volume can simply accept the block lists for each file, and create a new entry in the new file system that corresponds to the existing entry in the original file system. As before, the only information that needs to be transferred is the file metadata and block list. This technique allows very fast migration from one file system format to a new file system format, which can be done with minimal added storage overhead, allowing for even large file system format changes to be implemented, even on a nearly full storage array.

The virtual copy techniques described herein can work even if some user data is actually copied from one location to another. The physical copying of a portion of the user data does not remove the advantages of this approach. These techniques, however, do enable the storage system to eliminate most, if not all, of the user data movement in migrating from one data management format to another. In one embodiment, the server may mark files as transferred in the old file system, allowing automatic forwarding of requests to the new file system. This would allow the migration to be done with essentially zero downtime for users of the system. An individual file may have a short period during which it is locked as it's migrated from the old volume to the new volume, but this downtime would be on the order of milliseconds, at most, even for large files because only the file metadata is being recreated, and the underlying data need not actually be moved. Additional details of these virtual copy operations are provided below.

FIG. 1 is a block diagram illustrating a storage system 100 in which embodiments of the present disclosure may be implemented. Storage system 100 may include storage controller 110 and storage array 130, which is representative of any number of data storage arrays or storage device groups. As shown, storage array 130 includes storage devices 135A-n, which are representative of any number and type of storage devices (e.g., solid-state drives (SSDs)). Storage controller 110 may be coupled directly to initiator device 125 and storage controller 110 may be coupled remotely over network 120 to initiator device 115. Initiator devices 115 and 125 are representative of any number of clients which may utilize storage controller 110 for storing and accessing data in storage system 100. It is noted that some systems may include only a single client or initiator device, connected directly or remotely, to storage controller 110.

Storage controller 110 may include software and/or hardware configured to provide access to storage devices 135A-n. Although storage controller 110 is shown as being separate from storage array 130, in some embodiments, storage controller 110 may be located within storage array 130. Storage controller 110 may include or be coupled to a base operating system (OS), a volume manager, and additional control logic, such as virtual copy logic 140, for implementing the various techniques disclosed herein.

Storage controller 110 may include and/or execute on any number of processing devices and may include and/or execute on a single host computing device or be spread across multiple host computing devices, depending on the embodiment. In some embodiments, storage controller 110 may generally include or execute on one or more file servers and/or block servers. Storage controller 110 may use any of various techniques for replicating data across devices 135A-n to prevent loss of data due to the failure of a device or the failure of storage locations within a device. Storage controller 110 may also utilize any of various deduplication techniques for reducing the amount of data stored in devices 135A-n by deduplicating common data.

In one embodiment, storage controller 110 may utilize logical volumes and mediums to track client data that is stored in storage array 130. A medium is defined as a logical grouping of data, and each medium has an identifier with which to identify the logical grouping of data. A volume is a single accessible storage area with a single file system, typically, though not necessarily, resident on a single partition of a storage device. In one embodiment, storage controller 110 includes storage volumes 142 and 146. In other embodiments, storage controller 110 may include any number of additional or different storage volumes. In one embodiment, storage volume 142 may be a SAN volume providing block-based storage. The SAN volume 142 may include block data 144 controlled by a server-based operating system, where each block can be controlled as an individual hard drive. Each block in block data 144 can be identified by a corresponding block number and can be individually formatted. In one embodiment, storage volume 146 may be a NAS volume providing file-based storage. The NAS volume 146 may include file data 148 organized according to an installed file system. The files in file data 148 can be identified by file names and can include multiple underlying blocks of data which are not individually accessible by the file system.

In one embodiment, storage volumes 142 and 146 may be logical organizations of data physically located on one or more of storage device 135A-n in storage array 130. Storage controller 110 may maintain a volume to medium mapping table to map each volume to a single medium, and this medium is referred to as the volume's anchor medium. A given request received by storage controller 110 may indicate at least a volume and block address or file name, and storage controller 110 may determine an anchor medium targeted by the given request from the volume to medium mapping table.

In one embodiment, storage controller 110 includes virtual copy logic 140. Virtual copy logic 140 may receive a request and subsequently initiate the migration of data elements from one logical storage volume to another using a virtual copy. In response to receiving the request, virtual copy logic 140 may identify a number of data blocks from SAN volume 142 that are to be migrated. In one embodiment, at least some of the identified data blocks may have non-sequential block numbers in block data 144. Virtual copy logic 140 may further identify certain characteristics of the data blocks including, for example, a size of the data blocks, an owner of the data blocks, a creation time of the data blocks and a last modification time of the data blocks. If not already in existence, virtual copy logic 140 may generate a destination file as part of file data 148 in NAS volume 146. In one embodiment, to associate the data blocks from SAN volume 142 with the NAS volume 146, virtual copy logic 140 may generate volume metadata for the NAS volume 146 including the block numbers of the data blocks to be included in the volume and the identified characteristics of the data blocks. In addition, virtual copy logic may identify any file metadata present in the data blocks and create one or more files in file data 148 according to the filesystem used on NAS volume 146 using the file metadata. The file metadata may be stored as part of file data 148 or may be stored in some other designated location. As a result, the data blocks from SAN volume 142 are associated with the file in NAS volume 146 without having to copy or relocate any of the underlying data from storage devices 135A-n in storage array 130.

In various embodiments, multiple mapping tables may be maintained by storage controller 110. These mapping tables may include a medium mapping table and a volume to medium mapping table. These tables may be utilized to record and maintain the mappings between mediums and underlying mediums and the mappings between volumes and mediums. Storage controller 110 may also include an address translation table with a plurality of entries, wherein each entry holds a virtual-to-physical mapping for a corresponding data component. This mapping table may be used to map logical read/write requests from each of the initiator devices 115 and 125 to physical locations in storage devices 135A-n. A "physical" pointer value may be read from the mappings associated with a given medium during a lookup operation corresponding to a received read/write request. The term "mappings" is defined as the one or more entries of the address translation mapping table which convert a given medium ID and block number into a physical pointer value. This physical pointer value may then be used to locate a physical location within the storage devices 135A-n. The physical pointer value may be used to access another mapping table within a given storage device of the storage devices 135A-n. Consequently, one or more levels of indirection may exist between the physical pointer value and a target storage location.

In alternative embodiments, the number and type of client computers, initiator devices, storage controllers, networks, storage arrays, and data storage devices is not limited to those shown in FIG. 1. At various times one or more clients may operate offline. In addition, during operation, individual client computer connection types may change as users connect, disconnect, and reconnect to storage system 100. Further, the systems and methods described herein may be applied to directly attached storage systems or network attached storage systems and may include a host operating system configured to perform one or more aspects of the described methods. Numerous such alternatives are possible and are contemplated.

Network 120 may utilize a variety of techniques including wireless connection, direct local area network (LAN) connections, wide area network (WAN) connections such as the Internet, a router, storage area network, Ethernet, and others. Network 120 may comprise one or more LANs that may also be wireless. Network 120 may further include remote direct memory access (RDMA) hardware and/or software, transmission control protocol/internet protocol (TCP/IP) hardware and/or software, router, repeaters, switches, grids, and/or others. Protocols such as Fibre Channel, Fibre Channel over Ethernet (FCoE), iSCSI, and so forth may be used in network 120. The network 120 may interface with a set of communications protocols used for the Internet such as the Transmission Control Protocol (TCP) and the Internet Protocol (IP), or TCP/IP. In one embodiment, network 120 represents a storage area network (SAN) which provides access to consolidated, block level data storage. The SAN may be used to enhance the storage devices accessible to initiator devices so that the devices 135A-n appear to the initiator devices 115 and 125 as locally attached storage.

Initiator devices 115 and 125 are representative of any number of stationary or mobile computers such as desktop personal computers (PCs), servers, server farms, workstations, laptops, handheld computers, servers, personal digital assistants (PDAs), smart phones, and so forth. Generally speaking, initiator devices 115 and 125 include one or more processing devices, each comprising one or more processor cores. Each processor core includes circuitry for executing instructions according to a predefined general-purpose instruction set. For example, the x86 instruction set architecture may be selected. Alternatively, the ARM®, Alpha®, PowerPC®, SPARC®, or any other general-purpose instruction set architecture may be selected. The processor cores may access cache memory subsystems for data and computer program instructions. The cache subsystems may be coupled to a memory hierarchy comprising random access memory (RAM) and a storage device.

In one embodiment, initiator device 115 includes initiator application 112 and initiator device 125 includes initiator application 122. Initiator applications 112 and 122 may be any computer application programs designed to utilize the data from block data 144 or file data 148 in storage volumes 142 and 146 to implement or provide various functionalities. Initiator applications 112 and 122 may issue requests to migrate data within storage system 100. For example, the request may be to migrate all or a portion of block data 144 from SAN volume 142 to NAS volume 146. In response to the request, virtual copy logic 140 may use the virtual copy techniques described herein to generate the corresponding file metadata to indicate which blocks from block data 144 are to be associated with a file in file data 148. Thus, the migration can be performed without physically copying any of the underlying data or moving the data from one storage device to another.

In one embodiment, storage system 100 further includes host device 160. In certain embodiments, the file system used in connection with one or both of the storage volumes implemented on storage array 130 may run on host device 160, rather than storage controller 110. In this embodiment, virtual copy logic 140 can communicate with host device 160, over network 120, to obtain file system data and volume to medium mapping data to perform the data migration using virtual copy.

Figure 2:
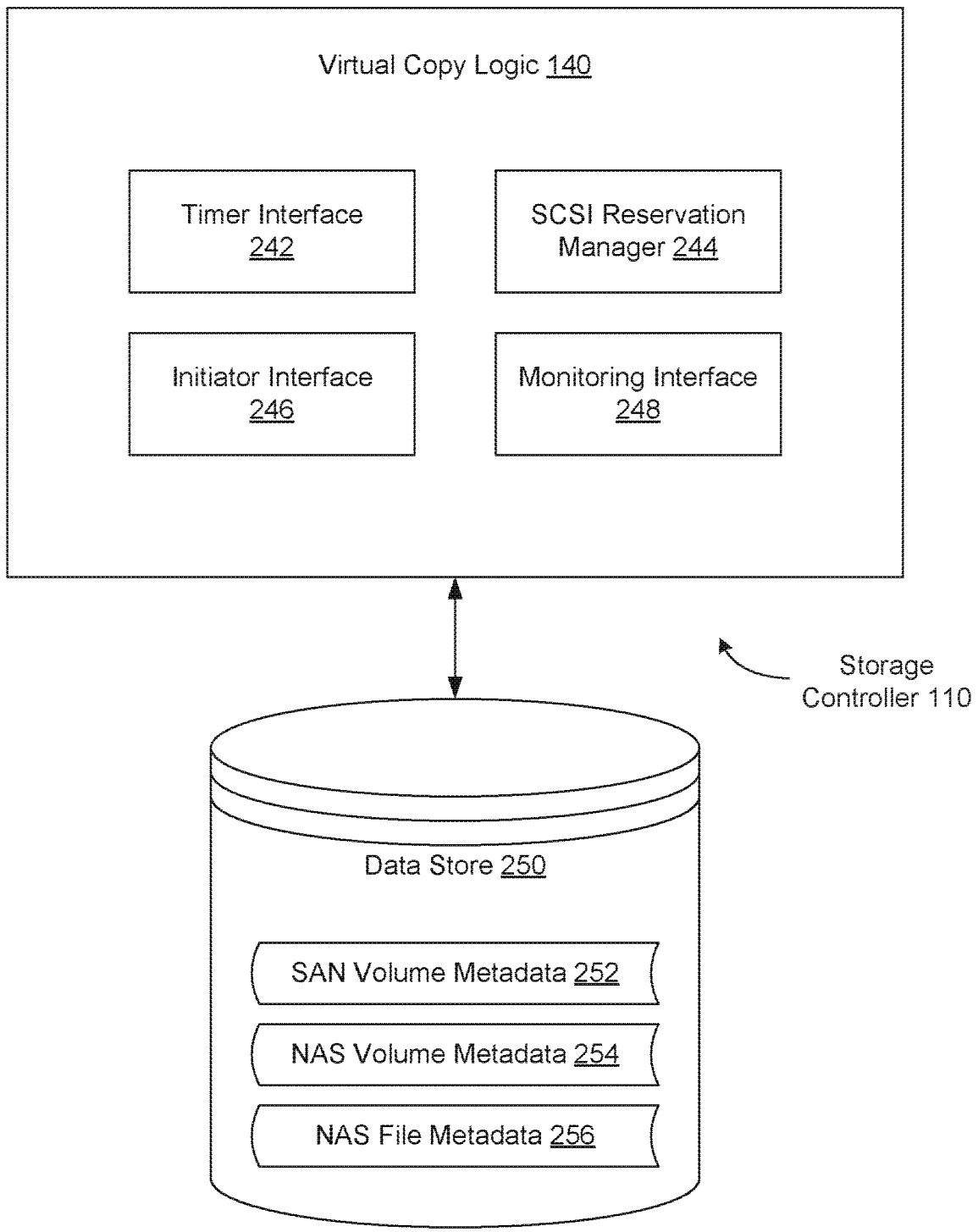
FIG. 2 is a block diagram illustrating virtual copy logic in a storage controller, according to an embodiment.

FIG. 2 is a block diagram illustrating virtual copy logic 140 in a storage controller 110, according to an embodiment. In one embodiment, virtual copy logic 140 includes initiator interface 242, data block interface 244, file system interface 246 and external host interface 248. This arrangement of modules may be a logical separation, and in other embodiments, these modules, interfaces or other components can be combined together or separated in further components. In one embodiment, data store 250 is connected to virtual copy logic 140 and includes SAN volume metadata 252, NAS volume metadata 254 and NAS file metadata 256. In another embodiment, one or more of SAN volume metadata 252, NAS volume metadata 254 and NAS file metadata 256 may be located elsewhere. For example, the metadata may be stored in a different volume managed by storage controller 110 or may be stored on a different one of storage devices 135A-n in storage array 130. In one embodiment, storage controller 110 may include virtual copy logic 140 and data store 250. In another embodiment, data store 250 may be external to storage controller 110 and may be connected to storage controller 110 over a network or other connection. In other embodiments, storage controller 110 may include different and/or additional components which are not shown to simplify the description. Data store 250 may include one or more mass storage devices which can include, for example, flash memory, magnetic or optical disks, or tape drives; read-only memory (ROM); random-access memory (RAM); erasable programmable memory (e.g., EPROM and EEPROM); flash memory; or any other type of storage medium.

In one embodiment, initiator interface 242 manages communication with initiator devices in storage system 100, such as initiator devices 115 or 125. Initiator interface 242 can receive I/O requests to access data storage volumes 142 and 146 from an initiator application 112 or 122 over network 120. In one embodiment, the I/O request includes a request to migrate at least a portion of block data 144 from SAN volume 142 to a file in file data 148 of NAS volume 146. The request may be received as part of the installation of a new storage system, the addition of new storage device to storage array 130, the upgrade of an existing storage volume, etc. After the migration is performed, using a virtual copy by other components of virtual copy logic 140, initiator interface may provide a notification to initiator device 115 or 125 over network 120 indicating that the migration was successfully performed.

In one embodiment, data block interface 244 interacts with SAN volume 142 as part of the virtual copy operation. For example, data block interface 244 may identify the blocks in block data 144 that were specified in the request received by initiator interface 242. In one embodiment, the request specifies a series of block numbers (e.g., 5, 100, 72, and 90) to identify those blocks that are to be migrated from SAN volume 142 to NAS volume 146. In one embodiment, at least some of the identified data blocks may have non-sequential block numbers in block data 144. In one embodiment, data block interface 244 may further identify certain characteristics of the data blocks including, for example, a size of the data blocks, an owner of the data blocks, a creation time of the data blocks, a last modification time of the data blocks, or other characteristics. Data block interface 244 may obtain these characteristics from SAN volume metadata 252 stored in data store 250 and associated with the blocks in block data 144.

In one embodiment, file system interface 246 interacts with NAS volume 146 as part of the virtual copy operation. File system interface 246 may determine if the target file has already been created by scanning the file names present in file data 148. In one embodiment, the name of the target file may be specified in the request received by initiator interface 242. If the target file does not exist, file system interface 246 may generate the file as part of file data 148 in NAS volume 146. In one embodiment, to associate the data blocks identified by data block interface 244 from SAN volume 142 with NAS volume 146, file system interface 246 may generate or annotate metadata associated with the volume. For example, file system interface 246 may write an indication of the block numbers to identify the data blocks to be migrated to NAS volume metadata 254 stored in data store 250. Virtual addressing allows the blocks associated with NAS volume 146 to point to the same underlying data blocks addressed by SAN volume 142. In addition, file system interface 246 may write the identified characteristics of the data blocks and any other information that can be used to populate the filesystem of NAS volume 146 to NAS file metadata 256. NAS file metadata 256 may be part of file data 148, for example, and may be a copy of file metadata present in one of the blocks virtually copied from SAN volume 142 to NAS volume 146. The file metadata may define which particular blocks in NAS volume 146 are part of a given file, identified by a unique file name, as well as the identified characteristics of the underlying data blocks.

In one embodiment, external host interface 248 interacts with external host device 160 (if present in storage system 100) as part of the virtual copy operation. In one embodiment, external host device 160 may have a file system used with one or more of the logical volumes maintained across storage array 130. When this logical volume is being used as the source volume, for example, in a virtual copy operation, storage controller 110 may not know how to read the logical volume. Thus, external host interface 248 can send a request to host device 160 for file and block mapping data associated with the logical volume. External host interface 248 can receive the requested information from host device 160, so that virtual copy logic 140 can determine which data blocks correspond to a particular file.

Figure 3:
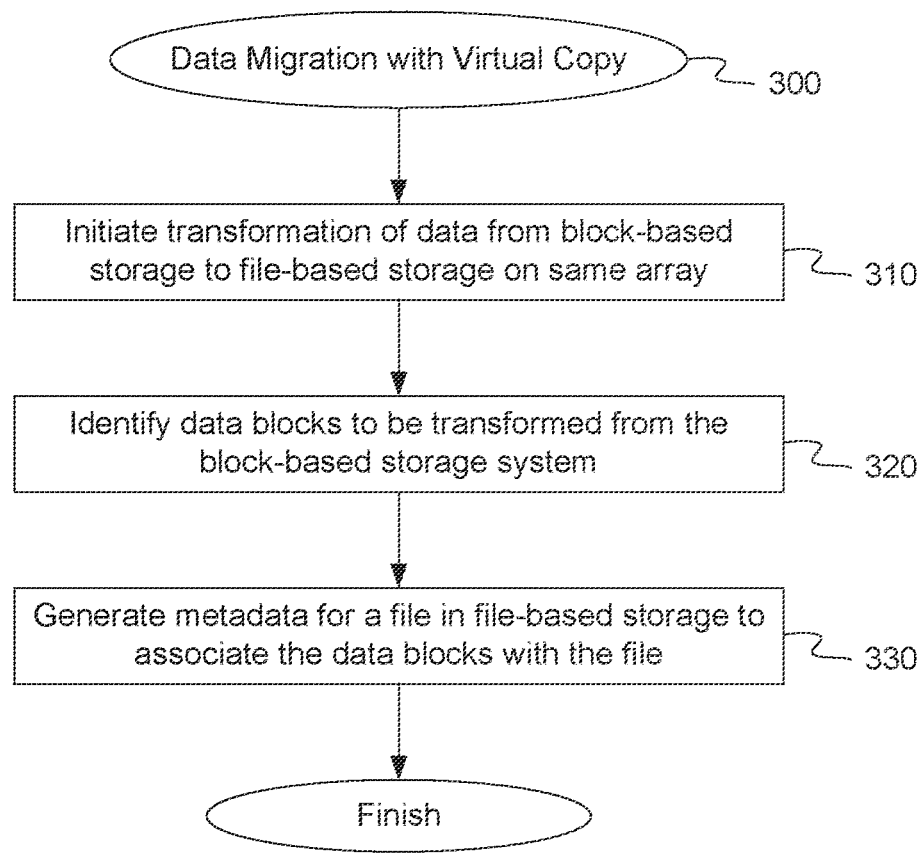
FIG. 3 is a flow diagram illustrating a method for data migration using virtual copy, according to an embodiment.

FIG. 3 is a flow diagram illustrating a method 300 for data migration using virtual copy, according to an embodiment. The method 300 may be performed by processing logic that comprises hardware (e.g., circuitry, dedicated logic, programmable logic, microcode, etc.), software (e.g., instructions run on a processing device to perform hardware simulation), or a combination thereof. The method 300 can allow migration of data from a block-based storage volume to a file-based storage volume and the creation of a file on the file-based storage volume by updating file metadata, which does not require the physical copying of any of the underlying data. In one embodiment, method 300 may be performed by virtual copy logic 140, as shown in FIGS. 1 and 2.

Referring to FIG. 3, at block 310, method 300 initiates a transformation of data from a block-based storage system resident on a storage array 130 to a file-based storage system resident on a storage array 130. In one embodiment, virtual copy logic 140 initiates the transformation in response to receiving a request from an initiator. For example, initiator interface 242 can receive a request to migrate at least a portion of block data 144 from SAN volume 142 to a file in file data 148 of NAS volume 146. The request may be received as part of the installation of a new storage system, the addition of new storage device to storage array 130, the upgrade of an existing storage volume, etc.

At block 320, method 300 identifies a plurality of data blocks to be transformed from the block-based storage system. In one embodiment, the request received by initiator interface 242 includes identifiers, such as block numbers, of certain data blocks to be added to the file-based storage system. Data block interface 244 may identify those designated blocks using the block numbers included in the request. In one embodiment, data block interface 244 additionally identifies certain characteristics of those data blocks from SAN volume metadata 252.

At block 330, method 300 generates volume metadata for the file-based storage volume, the metadata to associate the plurality of data blocks with the volume. In addition, file system interface 246 may generate file metadata to create a file on the file-based storage volume and associate at least some of the plurality of data blocks with the file. A name of the target file may be specified in the request received by initiator interface 242. In one embodiment, file system interface 246 may determine if the target file has already been created by scanning the file names present in file data 148. If the target file does not exist, file system interface 246 may generate the file as part of file data 148 in NAS volume 146. In one embodiment, file system interface 246 may write an indication of the block numbers to NAS file metadata 256 in order to associate the data blocks identified by data block interface 244 from SAN volume 142 with the file in NAS volume 146. In addition, file system interface 246 may write the identified characteristics of the data blocks and any other information that can be used to populate the filesystem of NAS volume 146 to NAS file metadata 256. In one embodiment, the data blocks associated with the file may maintain their original block numbers. For example, file system interface 246 may establish new links to the existing data where the new block numbers are the same as the original block numbers. In another embodiment, the data blocks may be renumbered to have sequential or consecutive block numbers. In either case, as a result, the data blocks from SAN volume 142 are associated with the file in NAS volume 146 without having to copy or relocate any of the underlying data from storage devices 135A-n in storage array 130.

Figure 4:
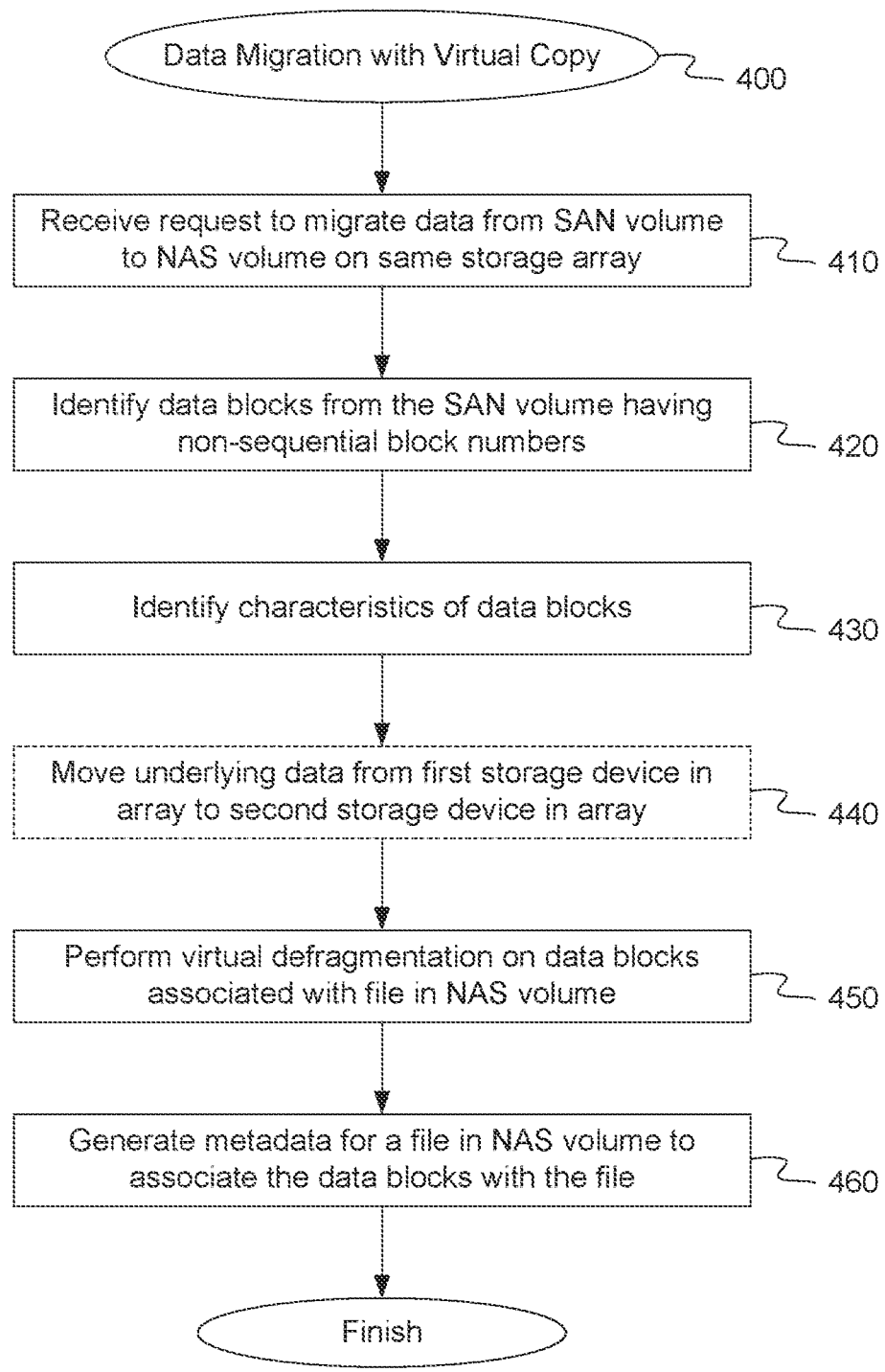
FIG. 4 is a flow diagram illustrating a method for data migration using virtual copy, according to an embodiment.

FIG. 4 is a flow diagram illustrating a method 400 for data migration using virtual copy, according to an embodiment. The method 400 may be performed by processing logic that comprises hardware (e.g., circuitry, dedicated logic, programmable logic, microcode, etc.), software (e.g., instructions run on a processing device to perform hardware simulation), or a combination thereof. The method 400 can allow migration of data from a SAN volume to a NAS volume and the creation of a file on the NAS volume by updating file metadata, which does not require the physical copying of any of the underlying data. In one embodiment, method 400 may be performed by virtual copy logic 140, as shown in FIGS. 1 and 2.

Referring to FIG. 4, at block 410, method 400 receives a request from an initiator application to migrate data from a SAN volume 142 resident on the storage array 130 to a NAS volume 146 resident on the same storage array 130. As described above with respect to block 310, initiator interface 242 can receive a request to migrate at least a portion of block data 144 from SAN volume 142 to a file in file data 148 of NAS volume 146.

At block 420, method 400 identifies a plurality of data blocks from the SAN volume 142, the plurality of data blocks having non-sequential block numbers. As described above with respect to block 320, data block interface 244 may identify the blocks using block numbers included in the request received at block 410. In one embodiment, at least two of the plurality of data blocks to be migrated may have non-sequential block numbers. As such, these at least two data blocks may not contain data that resides physically adjacent to each other on the underlying one of storage devices 135A-135n of storage array 130 and the at least two data blocks may not be able to be identified using an extent.

At block 430, method 400 identifies characteristics of the plurality of data blocks from the SAN volume 142. In one embodiment, data block interface 244 may obtain these characteristics from SAN volume metadata 252 stored in data store 250 and associated with the blocks in block data 144. The characteristics may include, for example, a size of the data blocks, an owner of the data blocks, a creation time of the data blocks, a last modification time of the data blocks, or other characteristics or information that can be used to populate the filesystem of NAS volume 146.

At block 440, method 400 optionally moves data underlying at least one of the plurality of data blocks associated with the file from a first storage device 135A in the storage array 130 to a second storage device 135B in the storage array. Although not required as part of the request to migrate the data, storage controller 110 may execute other operations involving the copying or relocating of data (e.g., a defragmentation operation). As a result, certain data may be moved between storage devices in order to optimize or improve the efficiency of future data access operations.

At block 450, method 400 performs a virtual defragmentation operation on the plurality of data blocks associated with the file in the NAS volume. In one embodiment, file system interface 246 may assign new sequential block numbers to the data blocks associated with the file. For example, file system interface 246 may establish new links with new block numbers to the existing data, while preserving their physical location on the underlying storage devices. The result is a virtual defragmentation performed by identifying blocks that go together and renumbering them so that they can be described more efficiently (e.g., by a single extent).

At block 460, method 400 generates metadata for a file in the NAS volume, the metadata to associate the plurality of data blocks with the file. In one embodiment, file system interface 246 may write an indication of the identified block numbers to NAS file metadata 256 in order to associate the data blocks identified by data block interface 244 from SAN volume 142 with the file in NAS volume 146. In addition, file system interface 246 may write the identified characteristics of the data blocks and any other information that can be used to populate the filesystem of NAS volume 146 to NAS file metadata 256. As a result, the data blocks from SAN volume 142 are associated with the file in NAS volume 146.

Figure 5:
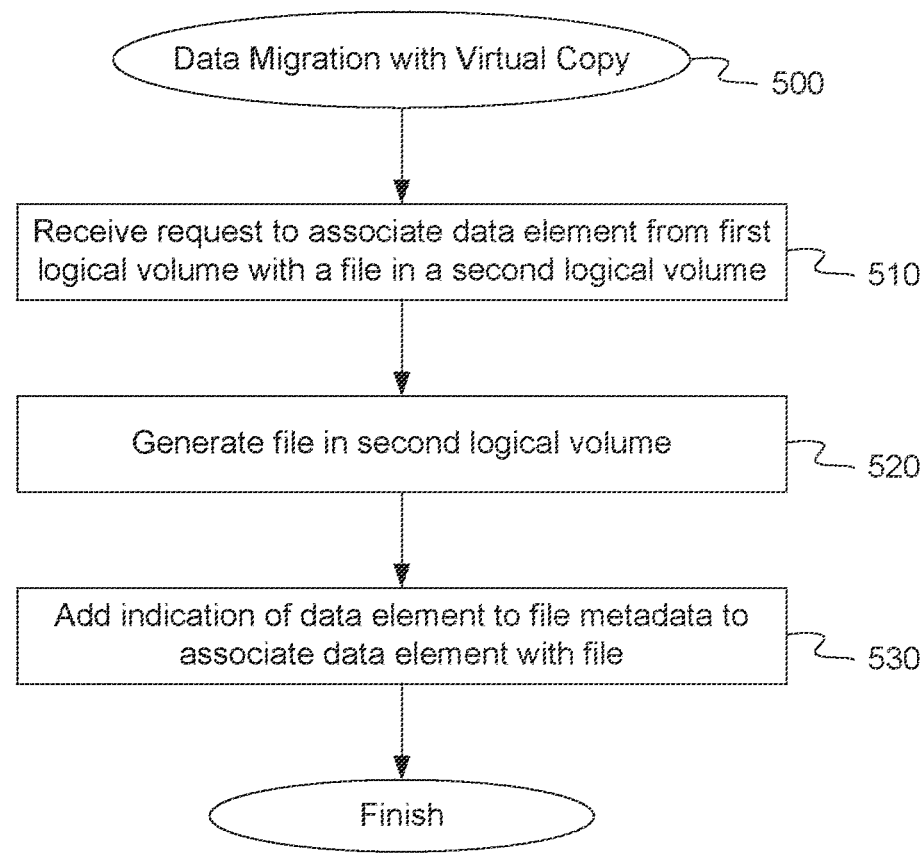
FIG. 5 is a flow diagram illustrating a method for data migration using virtual copy, according to an embodiment.

FIG. 5 is a flow diagram illustrating a method 500 for data migration using virtual copy, according to an embodiment. The method 500 may be performed by processing logic that comprises hardware (e.g., circuitry, dedicated logic, programmable logic, microcode, etc.), software (e.g., instructions run on a processing device to perform hardware simulation), or a combination thereof. The method 500 can allow migration of data from a first logical storage volume to a second logical storage volume and the creation of a file on the second logical storage volume by updating file metadata, which does not require the physical copying of any of the underlying data. In one embodiment, method 500 may be performed by virtual copy logic 140, as shown in FIGS. 1 and 2.

Referring to FIG. 5, at block 510, method 500 receives a request to associate a first data element from a first logical volume resident on a storage array with a file in a second logical volume resident on the storage array. In one embodiment, initiator interface 242 can receive the request from a user of storage controller 110 or from an initiator application 112 or 122 running on an initiator device 115 or 125 connected to storage controller 110 over a network 120. In one embodiment, the request may be to migrate at least a portion of block data 144 from SAN volume 142 to a file in file data 148 of NAS volume 146. In another embodiment, the request may be to associate data in one file system with a file in another file system maintained by storage controller 110 in the same storage array 130.

At block 520, method 500 generates the file in the second logical volume. In one embodiment, file system interface 246 may determine if the target file has already been created by scanning the file names present in file data 148. The name of the target file may be specified in the request received by initiator interface 242 at block 510. If the target file does not exist, file system interface 246 may generate the file as part of file data 148 in NAS volume 146.

At block 530, method 500 adds an indication of the first data element to volume metadata corresponding to the second logical volume, the indication in metadata to associate the first data element with the volume. In addition, file system interface 246 may copy file metadata from at least one of the data blocks to file metadata on the second logical volume, the file metadata to associate the first data element with the file. In one embodiment, to associate the data element with the file in NAS volume 146, file system interface 246 may generate or annotate file metadata associated with the file. For example, file system interface 246 may write an identifier of the data element (e.g., a block number or file name) to NAS file metadata 256 stored in data store 250 to associate the data element with the file.

Figure 6:
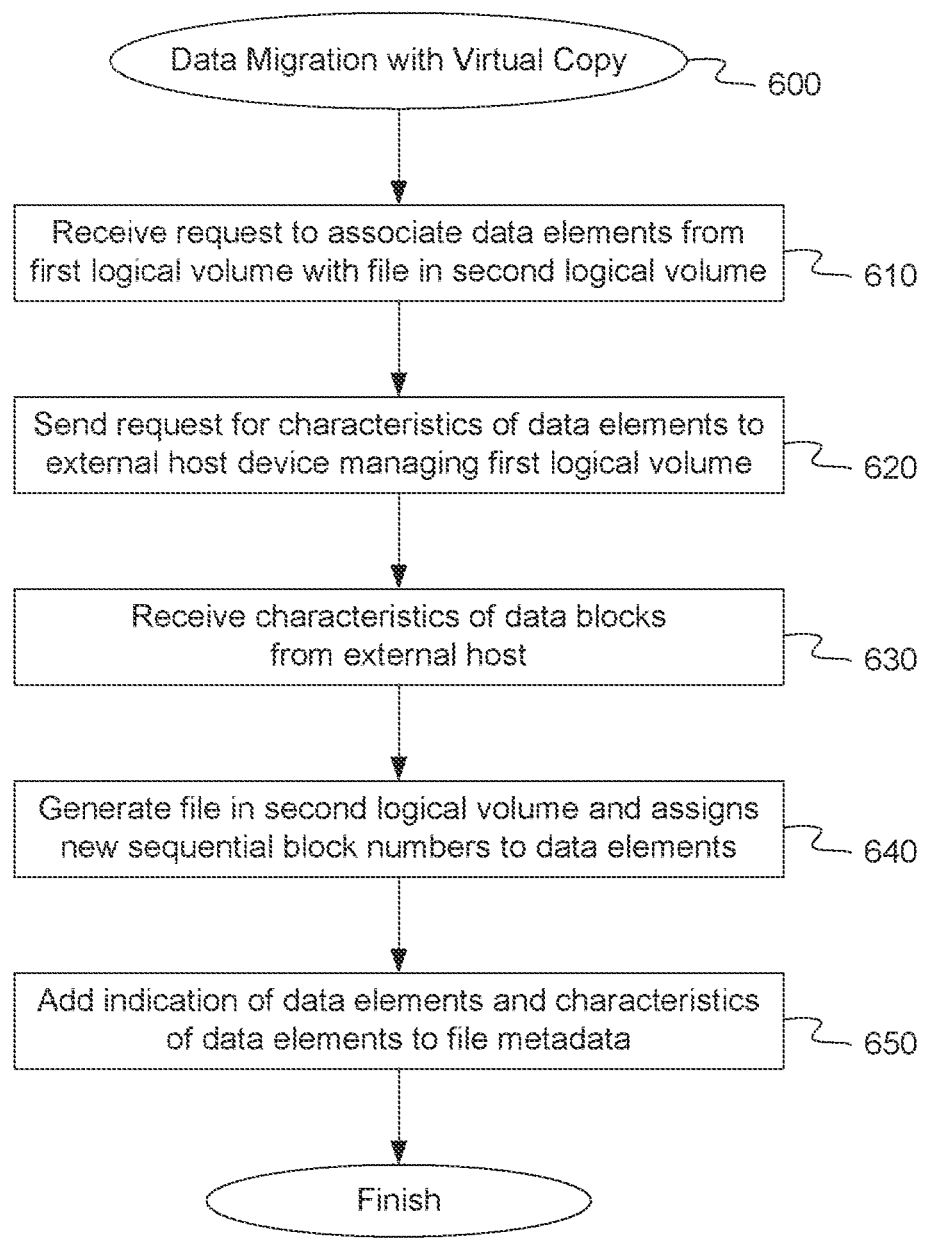
FIG. 6 is a flow diagram illustrating a method for data migration using virtual copy, according to an embodiment.

FIG. 6 is a flow diagram illustrating a method 600 for data migration using virtual copy, according to an embodiment. The method 600 may be performed by processing logic that comprises hardware (e.g., circuitry, dedicated logic, programmable logic, microcode, etc.), software (e.g., instructions run on a processing device to perform hardware simulation), or a combination thereof. The method 600 can allow migration of data from a first logical storage volume to a second logical storage volume and the creation of a file on the second logical storage volume by updating file metadata, which does not require the physical copying of any of the underlying data. In one embodiment, method 600 may be performed by virtual copy logic 140, as shown in FIGS. 1 and 2.

Referring to FIG. 6, at block 610, method 600 receives a request to associate a first data element and a second data element from a first logical volume resident on a storage array with a file in a second logical volume resident on the storage array. As described above with respect to block 510, in one embodiment, initiator interface 242 can receive the request from a user of storage controller 110 or from an initiator application 112 or 122 running on an initiator device 115 or 125 connected to storage controller 110 over a network 120. The request may include identifiers (e.g., block numbers) of the data elements to be associated with the file.

At block 620, method 600 sends a request for characteristics of the first and second data elements to an external host device 160 that manages the block-based storage system. In one embodiment, external host device 160 may have a file system used with one or more of the logical volumes maintained across storage array 130. When this logical volume is being used as the source volume, for example, in a virtual copy operation, storage controller 110 may not know how to read the logical volume. Thus, external host interface 248 can send a request to host device 160 for file and block mapping data associated with the logical volume.

At block 630, method 600 receives, from the external host device 160, the characteristics of the data elements. In one embodiment, external host interface 248 can receive the requested information from host device 160, so that virtual copy logic 140 can determine which data blocks correspond to a particular file.

At block 640, method 600 generates the file in the second logical volume. As described above with respect to block 520, in one embodiment, if the target file does not already exist, file system interface 246 may generate the file as part of file data 148 in NAS volume 146. In one embodiment, file system interface 246 may assign new sequential block numbers to the data elements associated with the file. For example, file system interface 246 may establish new links with new block numbers to the existing data, while preserving their physical locations on the underlying storage devices. The renumbering data blocks can thus be described by a single extent, making servicing future data access requests more efficient.

At block 650, method 600 adds an indication of the first and second data elements and the characteristics of the data elements to file metadata corresponding to the file in the second logical volume, the indication in metadata to associate the first and second data elements with the file. As described above with respect to block 530, in one embodiment, to associate the data element with the file in NAS volume 146, file system interface 246 may write an identifier of the data element (e.g., a block number or file name) to NAS file metadata 256 stored in data store 250 to associated the data element with the file.

Figure 7:
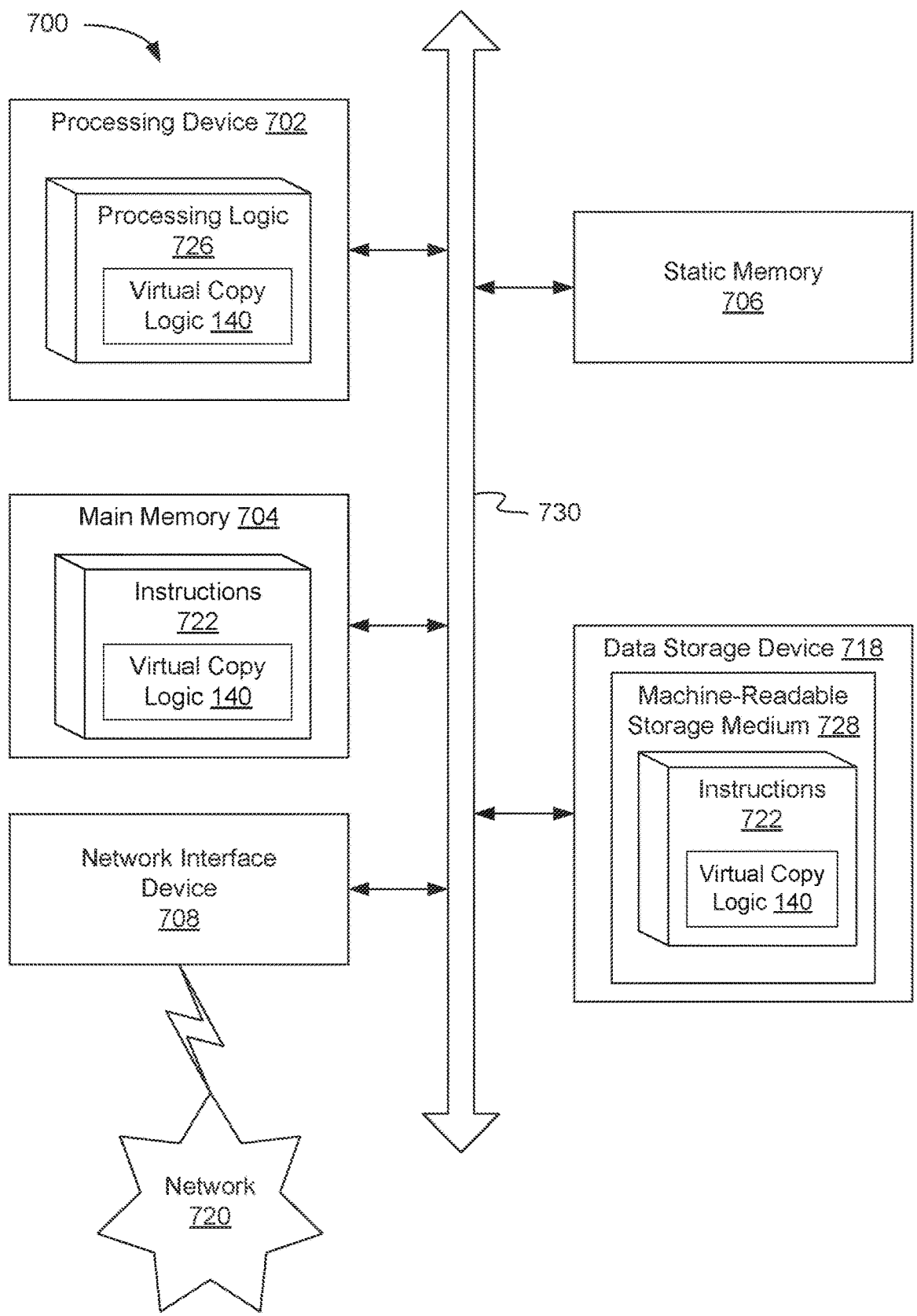
FIG. 7 is a block diagram illustrating an exemplary computer system, according to an embodiment.

FIG. 7 illustrates a diagrammatic representation of a machine in the exemplary form of a computer system 700 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 700 may be representative of a server, such as storage controller 110 running virtual copy logic 140 or of a client, such as initiator devices 115 or 125.

The exemplary computer system 700 includes a processing device 702, a main memory 704 (e.g., read-only memory (ROM), flash memory, dynamic random access memory (DRAM), a static memory 706 (e.g., flash memory, static random access memory (SRAM), etc.), and a data storage device 718, which communicate with each other via a bus 730. Data storage device 718 may be one example of any of the storage devices 135A-n in FIG. 1 or of data store 250 in FIG. 2. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 702 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute processing logic 726, which may be one example of virtual copy logic 140 shown in FIGS. 1 and 2, or of initiator application 112 or 122, for performing the operations and steps discussed herein.

The data storage device 718 may include a machine-readable storage medium 728, on which is stored one or more set of instructions 722 (e.g., software) embodying any one or more of the methodologies of functions described herein, including instructions to cause the processing device 702 to execute virtual copy logic 140 or initiator application 112 or 122. The instructions 722 may also reside, completely or at least partially, within the main memory 704 and/or within the processing device 702 during execution thereof by the computer system 700; the main memory 704 and the processing device 702 also constituting machine-readable storage media. The instructions 722 may further be transmitted or received over a network 720 via the network interface device 708.

The machine-readable storage medium 728 may also be used to store instructions to perform a method for data refresh in a distributed storage system without corruption of application state, as described herein. While the machine-readable storage medium 728 is shown in an exemplary embodiment to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

In situations in which the systems discussed herein collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the media server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the web server or media server.

Reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

What is claimed is:

1. A system comprising:
a storage array comprising one or more storage devices; and
a storage controller coupled to the storage array, the storage controller comprising a processing device, the processing device configured to:
receive a request from an initiator application to migrate data from a storage area network (SAN) volume resident on the storage array to a network attached storage (NAS) volume resident on the storage array; and
migrate the data to the NAS volume, wherein to migrate the data, the processing device is further configured to:
generate volume metadata for the NAS volume, the volume metadata to associate a plurality of data blocks from the SAN volume with the NAS volume; and
generate file metadata for a file in the NAS volume based on characteristics of the plurality of data blocks, wherein at least a portion of the file metadata is transferred from one of the plurality of data blocks from the SAN volume and wherein the file metadata is separate from the data.

2. The system of claim 1, wherein the data is migrated to the NAS without moving or copying the data to the SAN volume.

3. The system of claim 1, wherein the data is migrated without physically copying the data to the NAS volume.

4. The system of claim 1, wherein the initiator application is resident on a first initiator device coupled to the storage controller by a network.

5. The system of claim 1, wherein the processing device is further configured to:
renumber the plurality of data blocks associated with the file to have sequential block numbers in the NAS volume.

6. The system of claim 1, wherein the processing device is further configured to:
move the data underlying the plurality of data blocks associated with the file to a single one of the one or more storage devices.

7. The system of claim 1, wherein the characteristics include one of a size of the data blocks, an owner of the data blocks, a creation time of the data blocks, and a last modification time of the data.

8. A method comprising:
receiving a request from an initiator application to migrate data from a storage area network (SAN) volume resident on a storage array to a network attached storage (NAS) volume resident on the storage array; and
migrating, by a processing device, the data to the NAS volume, wherein migrating the data comprises:
generating volume metadata for the NAS volume, the volume metadata to associate a plurality of data blocks from the SAN volume with the NAS volume; and generating file metadata for a file in the NAS volume based on characteristics of the plurality of data blocks, wherein at least a portion of the file metadata is transferred from one of the plurality of data blocks from the SAN volume and wherein the file metadata is separate from the data.

9. The method of claim 8, wherein the request is received from an initiator application resident on a first initiator device coupled to a storage controller by a network.

10. The method of claim 8, wherein the data is migrated to the NAS without moving or copying the data to the SAN volume.

11. The method of claim 8, wherein the data is migrated without physically copying the data to the NAS volume.

12. The method of claim 8, further comprising:
renumbering the plurality of data blocks associated with the file to have sequential block numbers in the NAS volume.

13. The method of claim 8, further comprising:
moving the data underlying the plurality of data blocks associated with the file to a single one of one or more storage devices of the storage array.

14. The method of claim 8, wherein the characteristics include one of a size of the data blocks, an owner of the data blocks, a creation time of the data blocks, and a last modification time of the data.

15. A non-transitory computer readable storage medium storing instructions, which when executed, cause a processing device to:
receive a request from an initiator application to migrate data from a storage area network (SAN) volume resident on a storage array to a network attached storage (NAS) volume resident on the storage array; and
migrate, by the processing device, the data to the NAS volume, wherein to migrate the data, the processing device is further configured to:
generate volume metadata for the NAS volume, the volume metadata to associate a plurality of data blocks from the SAN volume with the NAS volume; and
generate file metadata for a file in the NAS volume based on characteristics of the plurality of data blocks, wherein at least a portion of the file metadata is transferred from one of the plurality of data blocks from the SAN volume and wherein the file metadata is separate from the data.

16. The non-transitory computer readable storage medium of claim 15, wherein the data is migrated to the NAS without moving or copying the data to the SAN volume.

17. The non-transitory computer readable storage medium of claim 15, wherein the data is migrated without physically copying the data to the NAS volume.

18. The non-transitory computer readable storage medium of claim 15, wherein the initiator application is resident on a first initiator device coupled to the storage controller by a network.

19. The non-transitory computer readable storage medium of claim 15, wherein the processing device is further configured to:
renumber the plurality of data blocks associated with the file to have sequential block numbers in the NAS volume.

20. The non-transitory computer readable storage medium of claim 15, wherein the processing device is further configured to:
move the data underlying the plurality of data blocks associated with the file to a single one of one or more storage devices of the storage array.

* * * * *